Patented Feb. 9, 1937

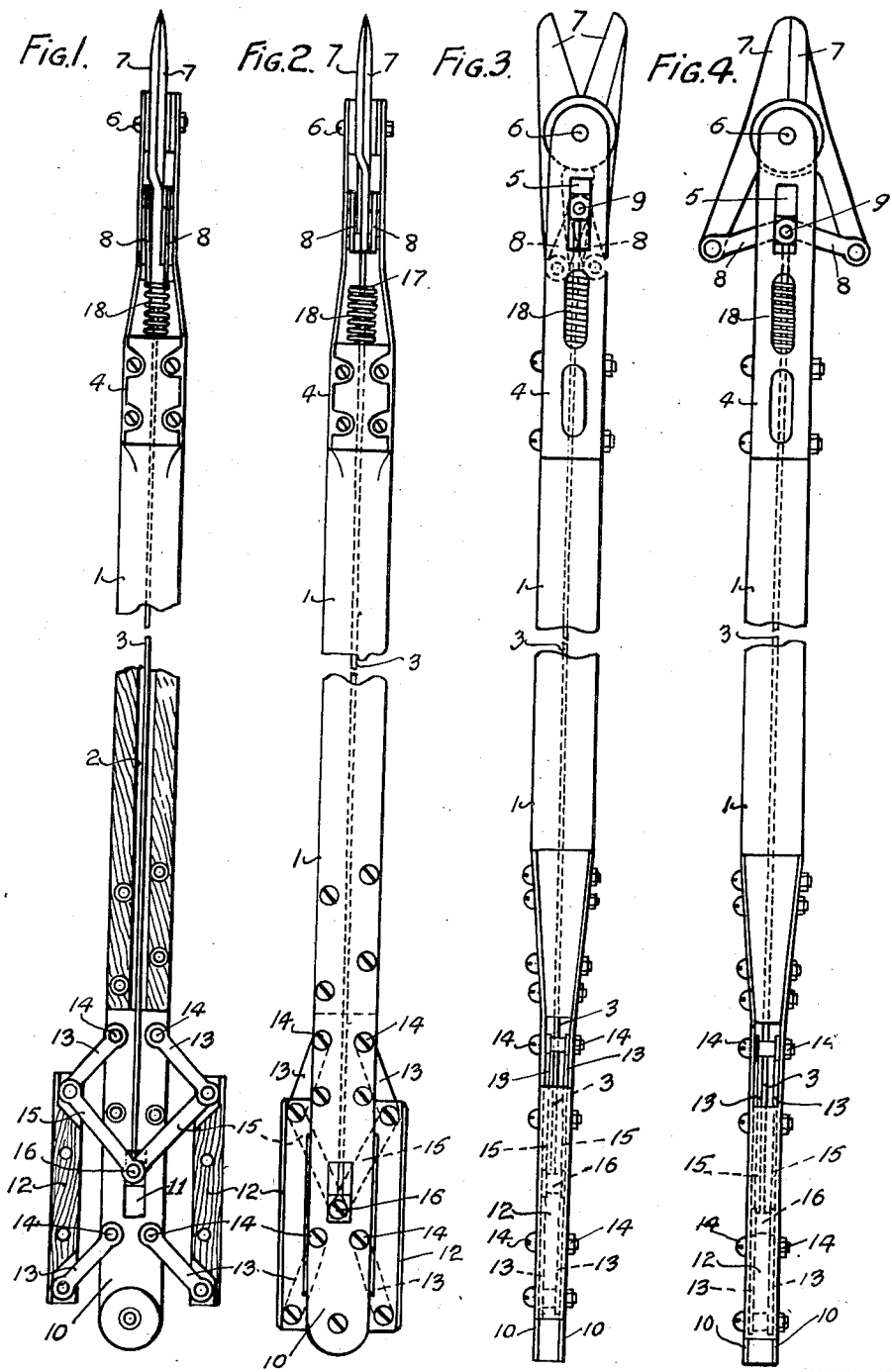

2,070,225

UNITED STATES PATENT OFFICE 2,070,225

PRUNING AND LIKE SHEARS

Robert Cochran Dickson, Bicknoller, near Taunton, England

Application July 13, 1936, Serial No. 90,402
In Great Britain August 28, 1935

2 Claims. (Cl. 30—11)

This invention refers to improvements in and relating to pruning and like shears, the object being to produce a shears by means of which pruning or other cutting can be effected which would ordinarily be out of reach of the operator.

According to this invention, the shears comprise a pair of cutting blades, with their rear ends connected by a toggle lever, mounted at one end of a rigid body member, and two operating members connected by a parallel motion gear to the opposite end of the body member and connected together by a toggle lever, the pivot pins of the toggle levers being connected by a wire or rod, the arrangement being such that gripping or loosening the operating members by the hand to cause them to move to or away from the body member, causes the cutting blades to move towards or away from each other.

In carrying out this invention, a rigid body member, preferably of wood, and of any suitable length, has pivoted at one end a pair of cutting blades, so arranged that their cutting edges do not cross, the rear ends of the blades being connected by a toggle lever whose pivot pin works in a guide in the body member.

At the opposite end of the body member are two operating members connected to the body member by parallel motion gear and connected together by a toggle lever whose pivot pin works in a guide in the body member.

The two pivot pins of the toggle levers are connected together by means of a wire or rod arranged longitudinally in a boring in the body member, and a coiled spring is arranged on one end of the body member adjacent the cutting blades to open the blades on release of the operating members.

The rigid body member is preferably made in halves, suitably grooved, the two halves being held together by binding or other suitable means.

The invention is illustrated in the accompanying drawing, in which:—

Fig. 1 is a partly sectional elevation with the parts in the open position;

Fig. 2 is an elevation with the parts in the closed position;

Fig. 3 is an elevation at right angles to that of Fig. 1 with the parts in the open position; and Fig. 4 is an elevation at right angles to that of Fig. 2 with the parts in the closed position.

As illustrated, the body member 1 has a central longitudinal boring 2 through which passes the wire or rod 3. On opposite sides of the forward end of the body member 1 are secured two plates 4, 4, each having a slot 5. Pivoted at 6 between these plates 4, 4 are a pair of cutting blades 7, 7, with a toggle lever 8 joining their rear ends, the pivot pin 9 of the toggle lever sliding in the slots 5.

On opposite sides of the rear end of the body member 1 are secured two plates 10, 10, each having a slot 11. The operating members 12, 12 are linked by parallel motion gear 13 to cross pins 14, 14 mounted between the plates 10, 10. A toggle lever 15 connects the two operating members 12, 12, and the pivot pin 16 of this toggle lever 15 slides in the slots 11.

Near the forward end of the wire or rod 3 is secured a stop 17, against which abuts one end of a coiled spring 18, surrounding the wire or rod 3, its other end abutting against the forward end of the body member 1.

The device operates as follows:—

Normally the cutting blades 7, 7 are open and the operating members 12, 12 away from the body member 1. Closing the hand around the operating members and pressing causes the operating members, owing to the parallel motion gear 13, to be moved towards the body member 1 and the pivot pin 16 of the toggle lever 15, connecting the operating members 12, 12, is moved in its guide 11 towards the rear of the handle. By means of the connecting wire or rod 3, the pivot pin 9 of the other toggle lever 8 is pulled in its guide 5 towards the handle end of the tool and causes the cutting blades 7, 7 to be closed. On release of the operating members 12, 12, the coiled spring 18, which has been compressed by the pull of the wire or rod 3 towards the rear, will expand, pushing forward the pivot pin 9 of the toggle lever 8 and causing the blades 7, 7 to open. At the same time the pivot pin 16 of the toggle lever 15 will be moved forward and will move the operating members 12, 12 away from the body member 1. Thus alternate gripping and loosening of the hand will effect alternate cutting and releasing of the cutting blades, in a similar manner to the working of a scissors.

I claim:—

1. Pruning shears comprising a rigid body member, said member being longitudinally bored, two plates secured on opposite sides of the forward end of the body member, said plates being slotted, a pair of cutting blades pivotally mounted between said plates, a toggle lever connecting the rear ends of the cutting blades, the pivot pin of said toggle lever sliding in the slots in said plates, two plates secured on opposite sides of the rear end of the body member, said plates being slotted, two operating members secured to said plates by parallel motion gear, a toggle lever arranged between said operating members and oppositely arranged to the first mentioned toggle lever, the pivot pin of the second mentioned toggle lever sliding in the slots in the rear plates, a rod connecting the pivot pins of the toggle levers and passing through the longitudinal boring in the body member and spring means for returning the cutting blades to normal open position on release of the operating members.

2. Pruning shears comprising a rigid body member, said member being longitudinally bored, two plates secured on opposite sides of the forward end of the body member, said plates being slotted, a pair of cutting blades pivotally mounted between said plates, a toggle lever connecting the rear ends of the cutting blades, the pivot pin of said toggle lever sliding in the slots in said plates, two plates secured on opposite sides of the rear end of the body member, said plates being slotted, two operating members secured to said plates by parallel motion gear, a toggle lever arranged between said operating members and oppositely arranged to the first mentioned toggle lever, the pivot pin of the second mentioned toggle lever sliding in the slots in the rear plates, a rod connecting the pivot pins of the toggle levers and passing through the longitudinal boring in the body member, a stop near the forward end of said connecting rod and a coiled spring mounted between said stop and the forward end of the body member.

ROBERT COCHRAN DICKSON.